US009747320B2

(12) United States Patent
Kesselman

(10) Patent No.: US 9,747,320 B2
(45) Date of Patent: Aug. 29, 2017

(54) EFFICIENT REFERENCE COUNTING IN CONTENT ADDRESSABLE STORAGE

(71) Applicant: GOOGLE INC., Mountain View, CA (US)

(72) Inventor: Alex Kesselman, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/051,612

(22) Filed: Feb. 23, 2016

(65) Prior Publication Data

US 2016/0170987 A1    Jun. 16, 2016

Related U.S. Application Data

(63) Continuation of application No. 13/952,517, filed on Jul. 26, 2013, now Pat. No. 9,268,806.

(51) Int. Cl.
*G06F 17/30* (2006.01)

(52) U.S. Cl.
CPC .... *G06F 17/3033* (2013.01); *G06F 17/30159* (2013.01); *G06F 17/30303* (2013.01); *G06F 17/30312* (2013.01); *G06F 17/30339* (2013.01); *G06F 17/30377* (2013.01)

(58) Field of Classification Search
CPC ........... G06F 17/3007; G06F 17/30097; G06F 17/30; G06F 17/30151; G06F 17/3033; G06F 17/30312; G06F 17/30159; G06F 17/30339
USPC .................................................. 707/600–899
See application file for complete search history.

(56) References Cited

U.S. PATENT DOCUMENTS

| | | |
|---|---|---|
| 2004/0236761 A1 | 11/2004 | Both |
| 2008/0270436 A1 | 10/2008 | Fineberg et al. |
| 2011/0196822 A1* | 8/2011 | Zunger ............. G06F 17/30575 707/609 |
| 2012/0166448 A1 | 6/2012 | Li et al. |

OTHER PUBLICATIONS

Austin, Grid Enabling Data De-duplication, e-science.pp. 2, Second IEEE International Conference on e-Science and Grid Computing (e-Science '06), 2006, 6 pgs.

(Continued)

*Primary Examiner* — Isaac M Woo
(74) *Attorney, Agent, or Firm* — Morgan, Lewis & Bockius LLP

(57) ABSTRACT

A process manages database storage. The process receives a first object comprising one or more content chunks. The first object is identified by a unique object ID and each content chunk has a unique offset within the first object. For each chunk, the process inserts a record into a reference table. The record includes a content hash and the object ID. The process stores each of the chunks in content storage. Later, the process obtains a request to delete a first chunk from storage. The first chunk has a corresponding first content hash. The process determines whether the reference table includes a reference record corresponding to the first content hash. When the reference table does not include any reference records corresponding to the first content hash, the process deletes the first chunk. When the reference table includes a corresponding reference record, the process does not delete the first chunk.

20 Claims, 11 Drawing Sheets

(56) References Cited

OTHER PUBLICATIONS

Efstathopoulos, Rethinking Deduplication Scalability, In HotStorage10, 2nd Workshop on Hot Topics in Storage and File Systems, 2010, 20 pgs.
Marks, Analysis: Using Data De-duplication to Cut Storage Requirements, www.scaleoutadvantage.techweb.com/news/str_nwe20070406_analysis.jhtml, Internet Archive Wayback Machine, Mar. 19, 2007, 5 pgs.
Nath, Evaluating the Usefulness of Content Addressable Storage for High-Performance Data Intensive Applications, HPDC 2008: 35-44 pgs.

* cited by examiner

EFFICIENT REFERENCE COUNTING IN CONTENT ADDRESSABLE STORAGE

CROSS REFERENCE TO RELATED APPLICATIONS

This application is a continuation of U.S. patent application Ser. No. 13/952,517, filed Jul. 26, 2013, entitled "Efficient Reference Counting in Content Addressable Storage," which is incorporated by reference herein in its entirety.

TECHNICAL FIELD

The disclosed implementations relate generally to managing de-duplication and garbage collection in a database storage system, and more specifically for content-addressable storage clusters.

BACKGROUND

The enterprise computing landscape has changed. The central-service architecture has given way to distributed storage clusters. Storage clusters can be built of commodity PCs that can deliver high performance, availability and scalability, and at a lower cost compared to monolithic disk arrays. The data is replicated across multiple geographical locations, which increases availability and reduces network distance from clients.

In a distributed storage system, objects (e.g., blobs) are dynamically created in different clusters. New visualization, multimedia, and other data-intensive applications use very large objects, with individual objects consuming hundreds of gigabytes of storage space or more, and the trend toward larger objects is expected to continue. When such objects are uploaded into a distributed storage system, other objects with identical content may already exist, or multiple instances of an object that suddenly became popular may be uploaded around the same time (e.g., as an email attachment to an email delivered to multiple recipients). De-duplication is a technique that allows storage of one physical replica of the content for a plurality of identical objects in the same storage cluster. This avoids passing the content around when it matches an existing object (e.g., by comparing a content hash), thus saving storage resources and network bandwidth. The value of de-duplication increases as the number of objects that reference a single physical content replica increases (e.g., a new 50 Gigabyte video can "go viral" from social networking, creating hundreds of thousands of copies in a very short period of time).

SUMMARY

Implementations of the present invention use a novel reference counting scheme for content-addressable storage clusters. References for a given content entry are stored in a reference table that is separate from the content index. The key in the content index is the content hash (e.g., using a hash function). In some implementations, the key in the reference table is a concatenation of a "write head," the content hash and the object ID of the object stored. The write head is derived from the object ID and has a limited size (e.g., 8-16 bits). In some implementations, the write head is object ID (mod N), where N is the total number of write heads (e.g., $2^8$). In some implementations, the reference table comprises a set of shards, each corresponding to a write head (e.g., if there are 256 write heads, then there are 256 corresponding reference table shards).

One advantage of this scheme is that multiple references for a single piece of content are spread out to various locations in the reference table, thus preventing or reducing hot spots in the reference table. In particular, each of the objects with a same content has its own object ID. Assuming the object IDs are randomly (or pseudo randomly) distributed, and assuming the computation of the write head includes that randomness (e.g., using low order bits), the records in the reference table for the same content are spread out in the reference key space (and in different physical shards in some implementations).

Despite spreading out references in the reference table, there is still fast deletion of objects and garbage collection. When an end user deletes an object, it is easy to look up the corresponding record in the reference table and delete it. Typically implementations execute garbage collection as a separate batch process, particularly where duplication is common. When a chunk of content is considered for garbage collection, the hash for the considered chunk is looked up in the reference table, in conjunction with each of the possible write heads. The lookup for each write head (or group of write heads) can be done in parallel, and thus can be completed quickly. Also, a content chunk can be eliminated as a garbage collection candidate as soon as a single reference to the chunk is found. As used herein, "chunk," "object chunk," and "content chunk" are used interchangeably, referring to the chunks that comprise the content of an object.

According to some implementations, a method of managing database storage is performed at a database storage system that has content storage, a content index, and a reference table. The database storage system includes one or more servers, each with one or more processors and memory. The content index identifies content chunks and the reference table stores references to each content chunk. The database storage system receives a first object for storage. The first object comprises one or more content chunks, and the first object is identified by a unique object ID. Each content chunk has a unique offset within the first object. In some cases, the first object comprises a single content chunk, but in other cases, first object comprises a plurality of content chunks. For each respective content chunk, the database storage system constructs a respective content hash of the respective content chunk. In some implementations, each respective content hash is computed using a hash function whose output is a fixed size integer. In some implementations, each respective content hash includes a sampling of content from the respective content chunk. In some implementations, the respective content hash is a content digest.

The database storage system looks up the respective content hash in the content index, and when the respective content hash is not found in the content index, the database storage performs the following actions: store the respective content chunk at a respective set of one or more locations in the content storage, and insert a record into the content index that includes the respective content hash and specifies the set of one or more locations where the respective content chunk is stored in the content storage. Regardless of whether the respective content hash was found in the content index, the database storage system inserts a respective reference record into the reference table. The respective reference record includes the respective content hash and the object ID. In some implementations, inserting the respective reference record into the reference table further includes computing a respective prefix that is based, at least in part, on the object ID. In some of these implementations, the respective reference record includes the respective prefix. In some implementations, the respective reference record comprises a concatenation of the respective prefix, the respective content hash, and the respective object ID, in that order. In some implementations, each respective reference record includes the offset of the respective chunk within the first object when the offset is greater than 0.

According to some implementations, the reference table is partitioned into a plurality of distinct shards, and inserting a respective reference record into the reference table comprises: computing a respective prefix that is based, at least in part, on the object ID, and inserting the respective reference record into a reference table shard corresponding to the respective prefix. In some implementations, the object ID is an integer, the number of distinct shards is a positive integer N, and the respective prefix is object ID (mod N).

According to some implementations, the method further comprises receiving a request to delete object content corresponding to a first content chunk from the content storage. The first content chunk has a corresponding first content hash. The database storage system searches for reference records in the reference table corresponding to the first content hash. When the search for reference records identifies no reference records corresponding to the first content hash, the database storage system deletes the first content chunk from the content storage. On the other hand, when the search for reference records identifies one or more reference records in the reference table, the database storage system rejects the request to delete object content corresponding to the first content chunk.

In some implementations, the database storage system is a distributed database that comprises a plurality of instances, at least some of which are at distinct geographic locations, and each instance has its own distinct local content storage. In some of these implementations, each instance has its own distinct local content index and local reference table.

In accordance with some implementations, the database storage system modifies the set of one or more locations where a first object chunk is stored in the content storage, and updates an entry in the content index that uniquely corresponds to the first object chunk, thereby specifying the modified set of one or more locations where the first object chunk is stored in the content storage.

BRIEF DESCRIPTION OF THE DRAWINGS

Like reference numerals refer to corresponding parts throughout the drawings.

DESCRIPTION OF IMPLEMENTATIONS

Some implementations of the disclosed database storage system 200 are distributed storage systems. Conversely, some implementations of the disclosed database storage system 200 reside at a single site or location, which can be very large in size. Before discussing techniques for managing a database storage system 200, it is instructive to present an exemplary system in which these techniques may be used.

Figure 1:
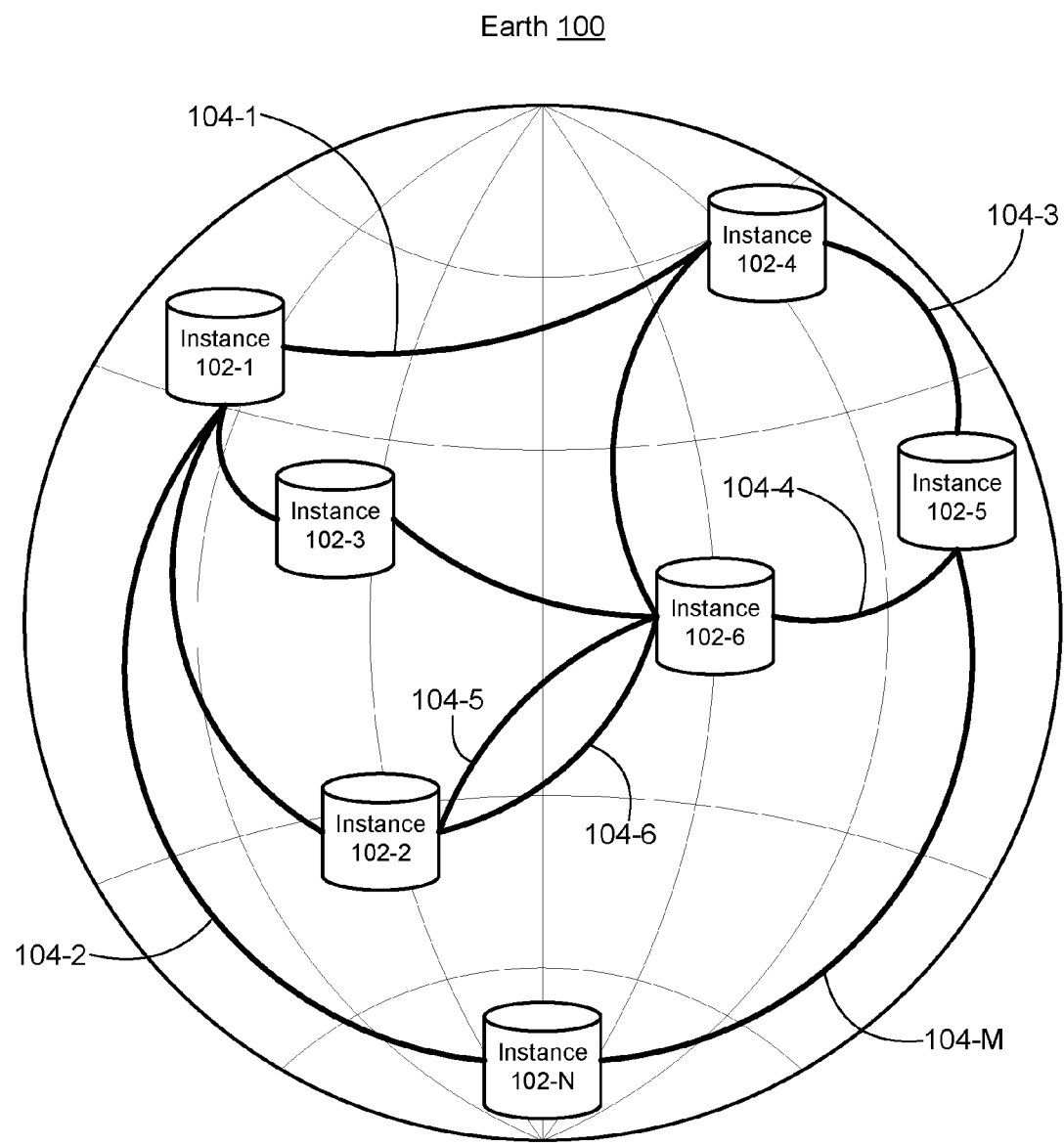
FIG. 1 is a conceptual illustration of a distributed storage system, according to some implementations.

As illustrated in FIG. 1, some implementations form a distributed storage system. There are multiple instances 102-1, 102-2, . . . 102-N at various locations on the Earth 100, connected by network communication links 104-1, 104-2, . . . 104-M. Note that an "instance" is also referred to as a "storage location" in this specification. Also note that one or more instances (storage locations) may be located at a particular physical location (e.g., a building, a set of buildings within a predetermined distance of each other, etc.). In some implementations, an instance (such as instance 102-1) corresponds to a data center. In some implementations, multiple instances are physically located at the same data center. A single implementation may have both individual instances at distinct geographic locations as well as one or more clusters of instances, where each cluster includes a plurality of instances, and the instances within each cluster are at a single geographic location.

Figure 4:
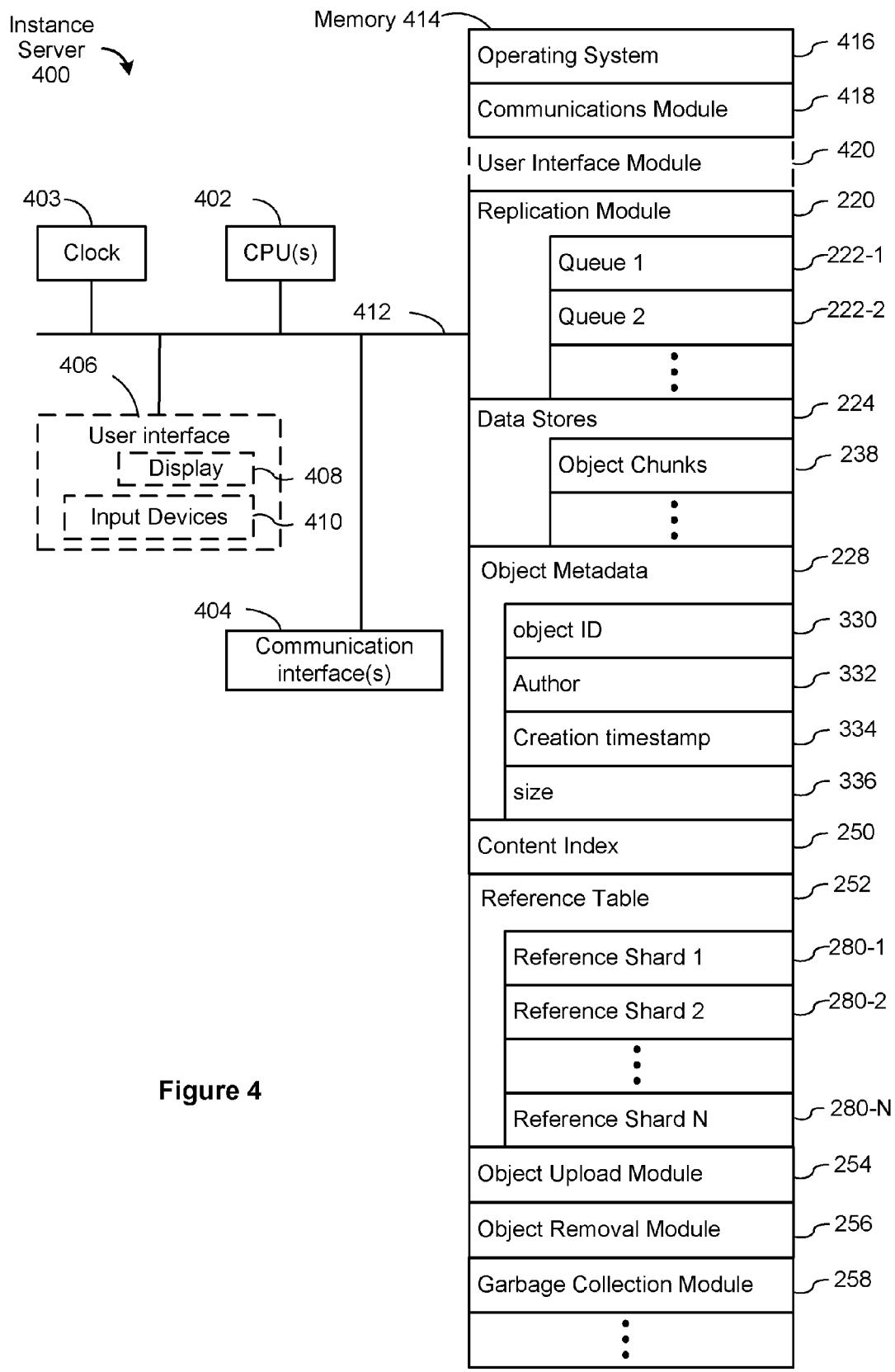
FIG. 4 is a block diagram of an instance server, according to some implementations.

Although the conceptual diagram of FIG. 1 illustrates a particular number of network communication links 104-1, etc., typical implementations may have more or fewer network communication links. In some implementations, there are two or more network communication links between the same pair of instances. For example, the network communication links 104-5 and 104-6 provide network connectivity between instance 102-2 and instance 102-6. In some implementations, the network communication links include fiber optic cable. In some implementations, some of the network communication links use wireless technology, such as microwaves. In some implementations, each network communication link has a specified bandwidth and/or a specified cost for the use of that bandwidth. In some implementations, statistics are maintained about the transfer of data across one or more of the network communication links, including throughput rate, times of availability, reliability of the links, etc. Each instance typically has data stores and associated databases, and utilizes a farm of server computers ("instance servers" as illustrated in FIG. 4) to perform all of the tasks. In some implementations, one or more instances of the distribute storage system has limited functionality. For example, the limited functionality may include acting as a repeater for data transmissions between other instances. Note that limited functionality instances may or may not include any of the data stores.

Figure 2:
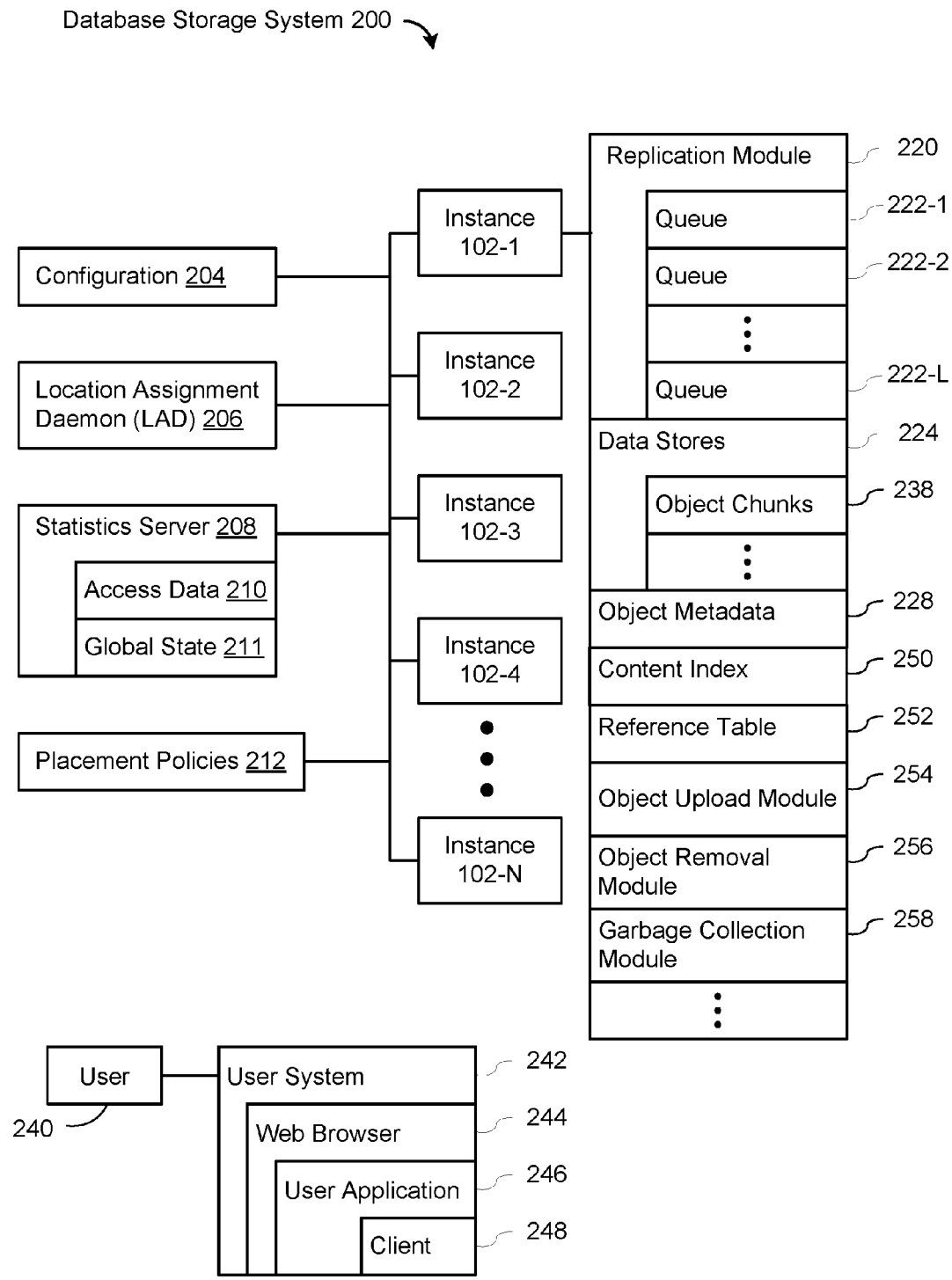
FIG. 2 is a block diagram illustrating the elements of a database storage system, according to some implementations.
Figure 5:
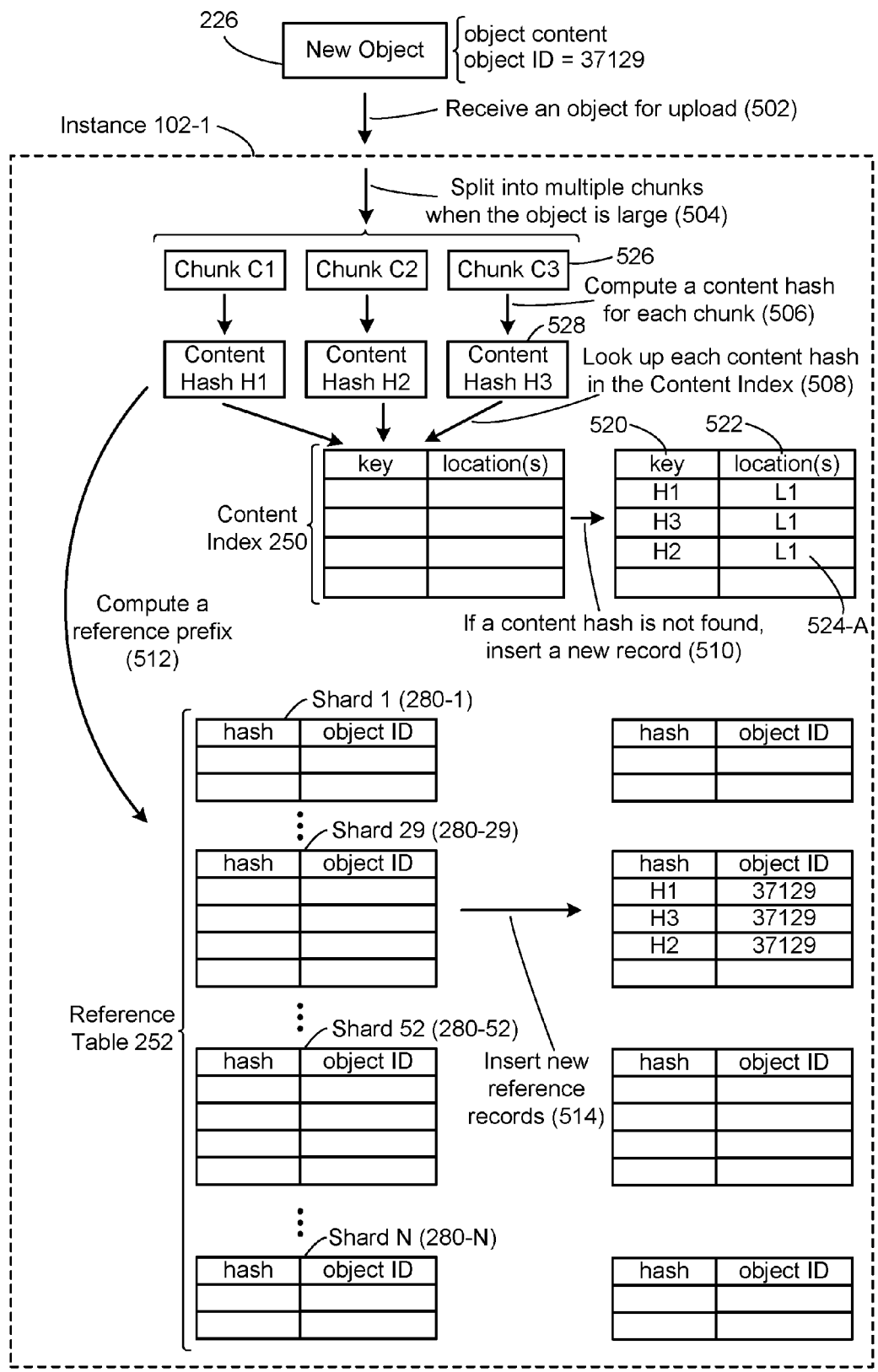
FIGS. 5 and 6 illustrate the process of uploading a new object to a database storage system in accordance with some implementations.
Figure 6:
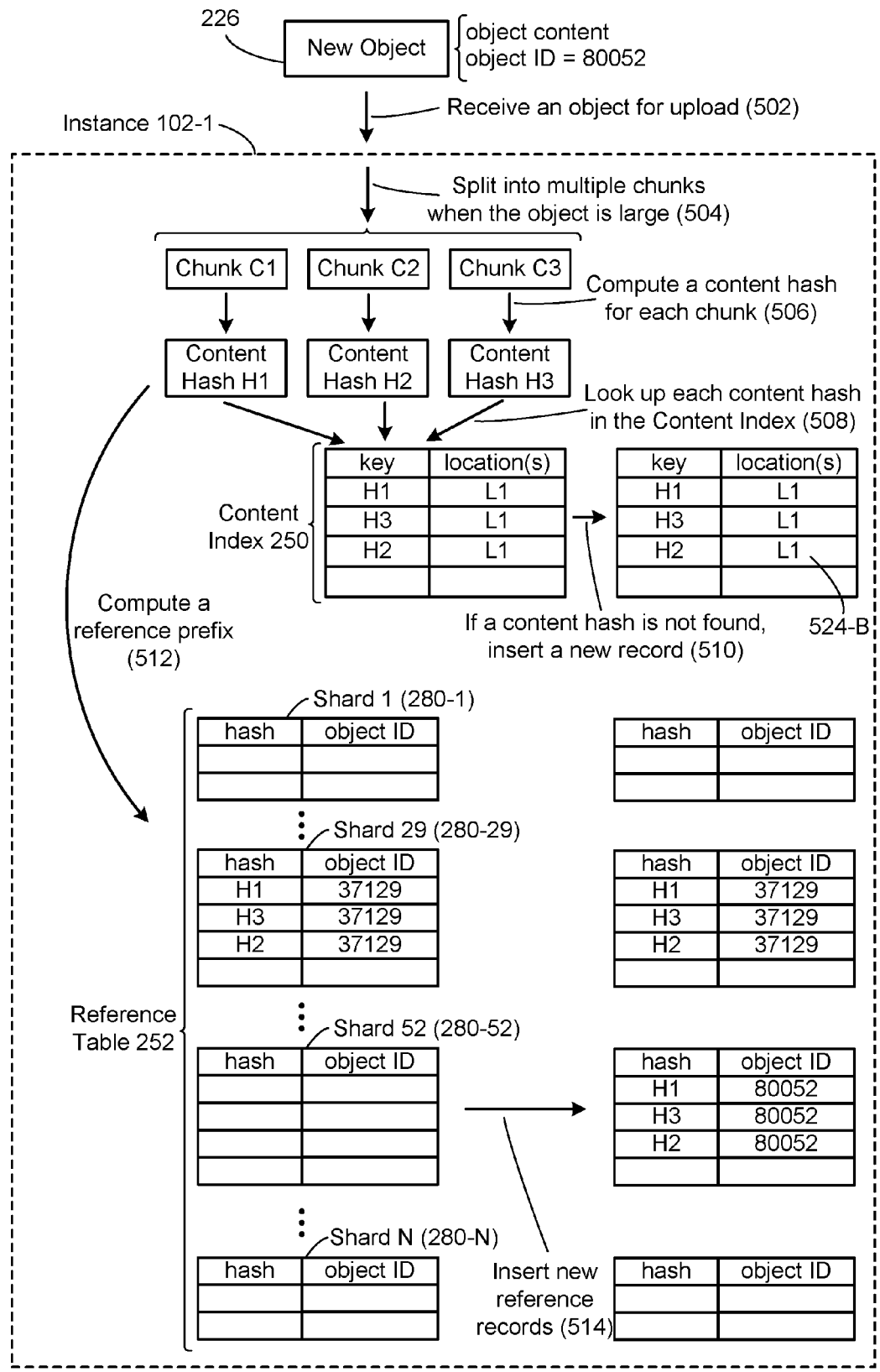

FIG. 2 is a block diagram illustrating the elements of a database storage system 200, according to some implementations. The database storage system 200 includes instances 102-1, 102-2, 102-3, 102-4, . . . 102-N. A respective instance 102-1 includes a replication module 220 that replicates object chunks 238 between instances. In some implementations, the object chunks 238 are stored in data stores 224 of the respective instance 102-1. Each object chunk 238 comprises an object 226 or a portion of an object 226, as illustrated in FIGS. 5 and 6. The data stores 224 may include distributed databases, file systems, tape backups, and any other type of storage system or device capable of storing objects. In some implementations, the replication module 220 uses one or more replication queues 222-1, 222-2, . . . , 222-L to replicate objects 226. Replication requests for objects to be replicated are placed in a replication queue 222, and the objects are replicated when resources (e.g., bandwidth) are available. In some implementations, replication requests in a replication queue 222 have assigned priorities, and the highest priority replication requests are replicated as bandwidth becomes available.

In some implementations, a background replication process creates and deletes copies of objects based on placement policies 212 and access data 210 (e.g., data indicating what objects users access and when) and/or a global state 211 provided by a statistics server 208. The placement policies 212 specify how many copies of an object are desired, where the copies should reside, and in what types of data stores the data should be saved. Using placement policies 212, together with the access data 210 (e.g., data regarding storage locations at which replicas of objects were accessed, times at which replicas of objects were accessed at storage locations, frequency of the accesses of objects at the storage locations, etc.) and/or the global state 211 provided by the statistics server 208, a location assignment daemon (LAD) 206 determines where to create new copies of an object and what copies may be deleted. When new copies are to be created, replication requests are inserted into a replication queue 222. In some implementations, the LAD 206 manages replicas of objects globally for the database storage system 200. In other words, there is only one LAD 206 in the database storage system 200.

Note that in general, a respective placement policy 212 may specify the number of replicas of an object to save, in what types of data stores the replicas should be saved, storage locations where the copies should be saved, etc. In some implementations, a respective placement policy 212 for an object includes criteria selected from the group consisting of a minimum number of replicas of the object that must be present in the database storage system, a maximum number of the replicas of the object that are allowed to be present in the database storage system, storage device types on which the replicas of the object are to be stored, locations at which the replicas of the object may be stored, locations at which the replicas of the object may not be stored, and a range of ages for the object during which the placement policy for the object applies. For example, a first placement policy may specify that each object in a webmail application must have a minimum of 2 replicas and a maximum of 5 replicas, wherein the replicas of the objects can be stored in data centers outside of China, and wherein at least 1 replica of each object must be stored on tape. A second placement policy for the webmail application may also specify that for objects older than 30 days, a minimum of 1 replica and a maximum of 3 replicas are stored in the database storage system 200, wherein the replicas of the objects can be stored in data centers outside of China, and wherein at least 1 replica of each object must be stored on tape.

In some implementations, a user 240 interacts with a user system 242, which may be a computer system or other device that can run a web browser 244. A user application 246 runs in the web browser, and uses functionality provided by database client 248 to access data stored in the database storage system 200 using a network. The network may be the Internet, a local area network (LAN), a wide area network (WAN), a wireless network (WiFi), a local intranet, or any combination of these. In some implementations, the database client 248 uses information in a global configuration store 204 to identify an appropriate instance to respond to the request. In some implementations, user application 246 runs on the user system 242 without a web browser 244. Exemplary user applications include an email application and an online video application.

In some implementations, each instance stores object metadata 228 for each of the objects stored in the database storage system 200. Some instances store object metadata 228 only for the objects that have replicas stored at the instance (referred to as a "local instances"). Some instances store object metadata 228 for all objects stored anywhere in the database storage system (referred to as "global instances"). The object metadata 228 is described in more detail with respect to FIGS. 3 and 4.

In some implementations, each instance stores a content index 250, which identifies object chunks 238 using a content hash (e.g., a hash of the content, a digest of the content, a combination of the two, or other representation of the content in a small size). In some implementations, the content hash is unique, or nearly unique. Some implementations include special handling for cases where two distinct content chunks have the same content hash. The content hash enables quick lookup of content, which is used to prevent storage of multiple copies of the same identical content. The content index is described in more detail in FIGS. 5-8 below. Each record in the content index corresponds to a single piece of physically stored data, and generally identifies the location where the data resides (e.g., which chunk store, and where within the chunk store).

Disclosed implementations include a reference table 252, which includes a record for each chunk reference. The reference table 252 stores a chunk reference for each object chunk 238, regardless of duplication (even duplication within a single object). A chunk reference includes the content hash used in the content index 250, as well as the object ID. In some implementations, each chunk reference includes a reference prefix, which is sometimes referred to as a write head. The reference prefix is used to spread out references to the same content chunk 238, as described in more detail below with respect to FIGS. 5 and 6. In some implementations, a chunk reference also includes the offset of the corresponding chunk within the object 226. In some implementations, the chunk offset within a chunk reference is appended to the object ID, and thus the combination acts as a chunk ID. In some implementations, the chunk offset is included in a chunk reference only when the offset is greater than zero (i.e., the second and subsequent chunks in objects that have more than a single chunk). In practice, most objects consist of a single chunk, and thus the offset of the chunk is zero.

Each instance 102 that includes data stores 224 has an Object Upload Module 254 that handles the process of receiving and storing objects 226 into the data stores 224. The Object Upload Module is described in more detail with respect to FIGS. 5 and 6. The Object Removal Module 256 handles the complementary task of removing object references. The Object Removal Module is described in more detail with respect to FIG. 7. Note that the Object Removal Module 256 only removes object references. The actual deletion of content (e.g., deallocation of space consumed by a content chunk 238) is performed by the Garbage Collection Module 258. In some implementations, the Object Upload Module 254 and Object Removal Module 256 are combined or share certain procedures.

Implementations of the present invention typically include a Garbage Collection Module 258. Over time, object references are deleted by the Object Removal Module 256 (e.g., when an end user "deletes" an object), so there is an increasing number of stored object chunks that have no corresponding references. Such unreferenced chunks represented wasted space. In some implementation, the Garbage Collection Module 258 runs periodically (or on demand) to identify the unreferenced chunks and physically remove them from storage. This is described in more detail with respect to FIG. 8.

In some implementations, garbage collection is triggered by one or more conditions, such as available disk space dropping below a threshold value or statistical information suggesting the presence of a lot of wasted space (e.g., by counting delete operations after the last garbage collection operation). Some implementations utilize both scheduled periodic garbage collection as well as condition-triggered garbage collection (which may reset the next scheduled periodic garbage collection). In some implementations, condition triggered garbage collection is still partially scheduled to avoid performing garbage collection during peak usage periods (e.g., if available disk space is low, trigger garbage collection during the next overnight off-peak period).

Figure 3:
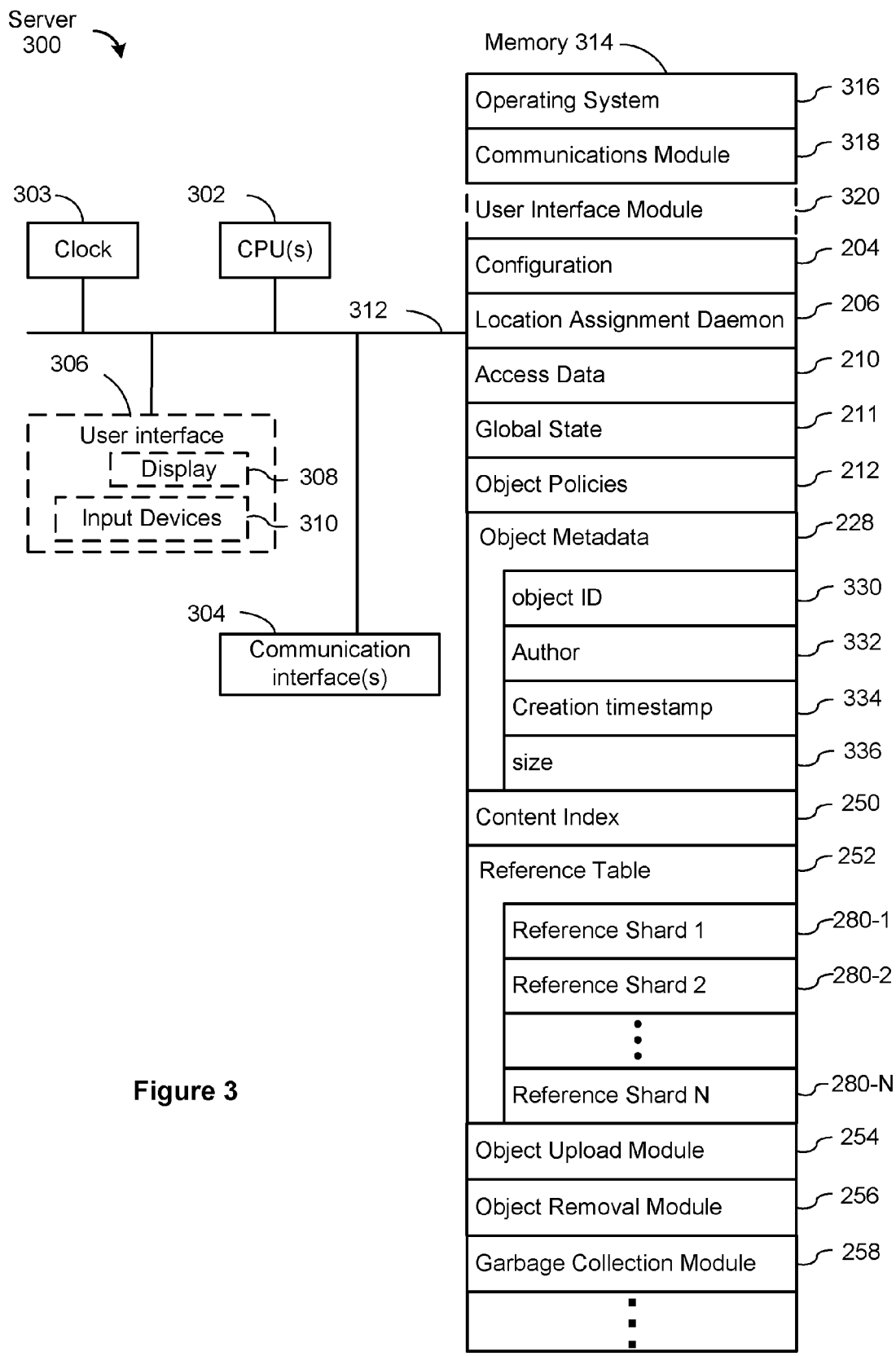
FIG. 3 is a block diagram of a server, according to some implementations.

FIG. 3 is a block diagram of a server 300, according to some implementations. The server 300 typically includes one or more processing units (CPU's) 302, a clock 303 that reports the current date and/or time, one or more network or other communications interfaces 304, memory 314, and one or more communication buses 312 for interconnecting these components. The communication buses 312 may include circuitry (sometimes called a chipset) that interconnects and controls communications between system components. In some implementations, the clock 303 is a local clock that is periodically synchronized with a clock server (e.g., a quorum clock server or any other clock server on a network, etc.). The server 300 optionally may include a user interface 306 comprising a display device 308 and input devices 310 (e.g., keyboard, mouse, touch screen, keypads, etc.). Memory 314 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 314 may optionally include one or more storage devices remotely located from the CPU(s) 302. Memory 314, or alternately the non-volatile memory device(s) within memory 314, comprises a computer readable storage medium. In some implementations, memory 314 stores the following programs, modules and data structures, or a subset thereof:

- an operating system 316 that includes procedures for handling various basic system services and for performing hardware dependent tasks;
- a communication module 318 that is used for connecting the server 300 to other computers via the one or more communication interfaces 304 (wired or wireless) and one or more communication networks, such as the Internet, other wide area networks, local area networks, metropolitan area networks, and so on;
- an optional user interface module 320 that receives commands from the user via the input devices 310 and generates user interface objects in the display device 308;
- the configuration 204, as described herein;
- the LAD 206, as described herein;
- access data 210, as described herein;
- the global state 211, as described herein;
- the placement policies 212, as described herein;
- object metadata 228 for the objects stored in the database storage system 200. The object metadata 228 may include an object ID 330, which uniquely identifies the object within the database storage system. The metadata 228 may include the author 332 of the object, which may be a name and/or identifier of a person or entity (e.g., email address). In some implementations, the identifier is unique. The metadata may include a datestamp or timestamp 334 when the object was created (e.g., uploaded to the database storage system). The metadata may include the size 336 of the object, which is typically measured in bytes or allocation blocks;
- a content index 250, which specifies the physical locations of the object chunks 238. The key is a content hash of each content chunk, as described in more detail with respect to FIGS. 2 and 5-8;
- a reference table 252, which includes an entry for each reference to a content chunk 238. In some implementations, the reference table 252 is partitioned into a plurality of shards 280-1, 280-2, . . . , 280-N. In some implementations, the shards 280 are physically distinct files. The reference table 252 is described in more detail with respect to FIGS. 2 and 5-8;
- an object upload module 254, which performs all of the operations needed to upload a new object 226. The object upload module 254 is described in more detail with respect to FIGS. 5 and 6;
- an object removal module 256, which removes object references from the reference table 252 when an object is "deleted." The object removal module is described in more detail with respect to FIG. 7; and
- a garbage collection module 258, which deallocates the storage space used by object chunks that are no longer referenced. The garbage collection module 258 is described in more detail with respect to FIG. 8.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 314 may store a subset of the modules and data structures identified above. Furthermore, memory 314 may store additional modules and data structures not described above.

Although FIG. 3 shows a "server," FIG. 3 is intended more as functional description of the various features that may be present in a set of servers 300 than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers and how features are allocated among them will vary from one implementation to another, and may depend in part on the amount of data traffic that the system must handle during peak usage periods as well as during average usage periods. In some implementations, a subset of the LAD 206, the access data 210, the global state 211, and the placement policies 212 are located on separate servers. For example, the LAD 206 may be located at a server (or set of servers), the access data 210 and the global state 211 may be located and maintained by a statistics server 208 (or a set of statistics servers 208), and the placement policies 212 may be located on another server (or a set of other servers).

FIG. 4 is a block diagram of an instance server 400 for an instance 102, according to some implementations. The instance server 400 typically includes one or more processing units (CPU's) 402 for executing modules, a clock 403 that reports the current date and/or time, programs and/or instructions stored in memory 414 and thereby performing processing operations, one or more network or other communications interfaces 404, memory 414, and one or more communication buses 412 for interconnecting these components. In some implementations, the clock 403 is a local clock that is periodically synchronized with a clock server (e.g., a quorum clock server or any other clock server on a network, etc.). In some implementations, the instance server 400 includes a user interface 406 comprising a display device 408 and one or more input devices 410. In some implementations, memory 414 includes high-speed random access memory, such as DRAM, SRAM, DDR RAM or other random access solid state memory devices. In some implementations, memory 414 includes non-volatile memory, such as one or more magnetic disk storage devices, optical disk storage devices, flash memory devices, or other non-volatile solid state storage devices. In some implementations, memory 414 includes one or more storage devices remotely located from the CPU(s) 402. Memory 414, or alternately the non-volatile memory device(s) within memory 414, comprises a computer readable storage medium. In some implementations, memory 414 or the computer readable storage medium of memory 414 stores the following programs, modules and data structures, or a subset thereof:

- an operating system 416 that includes procedures for handling various basic system services and for performing hardware dependent tasks;
- a communications module 418 that is used for connecting the instance server 400 to other instance servers or computers via the one or more communication network interfaces 404 (wired or wireless) and one or more communication networks, such as the Internet, other wide area networks, local area networks, metropolitan area networks, and so on;
- an optional user interface module 420 that receives commands from the user via the input devices 410 and generates user interface objects in the display device 408;
- a replication module 220 and replication queues 222, as described herein;
- data stores 224 (e.g., distributed databases, file systems, tape stores, Big Tables, etc.) that store the object chunks 238 as described with respect to FIG. 2;
- object metadata 228 and corresponding metadata elements 330-336, as described in FIG. 3 with respect to server 300;
- a content index 250, as described with respect to FIGS. 2, 3, and 5-8;
- a reference table 252, as described with respect to FIGS. 2, 3, and 5-8, which may comprise a plurality of shards 280-1, 280-2, . . . , 280-N; and
- an object upload module 254, which performs all of the operations needed to upload a new object 226. The object upload module 254 is described in more detail with respect to FIGS. 5, and 6;
- an object removal module 256, which removes object references from the reference table 252 when an object is "deleted." The object removal module is described in more detail with respect to FIG. 7; and
- a garbage collection module 258, which deallocates the storage space used by object chunks that are no longer referenced. The garbage collection module 258 is described in more detail with respect to FIG. 8.

Each of the above identified elements may be stored in one or more of the previously mentioned memory devices, and corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 414 may store a subset of the modules and data structures identified above. Furthermore, memory 414 may store additional modules and data structures not described above.

Although FIG. 4 shows an "instance server," FIG. 4 is intended more as functional description of the various features that may be present in a set of instance servers 400 than as a structural schematic of the implementations described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers and how features are allocated among them will vary from one implementation to another, and may depend in part on the amount of data traffic that the server must handle during peak usage periods as well as during average usage periods. For example, at a single instance 102 there may be a hundred instance servers 400 or thousands of instance servers 400.

In some implementations, to provide faster responses to clients and to provide fault tolerance, each program or process that runs at an instance is distributed among multiple computers. The number of instance servers 400 assigned to each of the programs or processes can vary, and depends on the workload.

FIGS. 5 and 6 illustrate the process that the object upload module 254 uses to upload a new object 226 to a database storage system in accordance with some implementations. FIG. 5 presents the scenario where the content chunks 238 are not duplicates of existing content chunks 238 already stored. FIG. 6 presents the scenario where the content chunks 238 of the new object 226 are duplicates of existing stored content chunks 238. Of course, it is possible for a new object 238 to comprise content chunks 238 in both scenarios (i.e., some chunks already exist in the data stores 224, whereas other chunks are not already stored in the data stores 224), but this is not common.

As shown in FIG. 5, a new object 226 is received (502) at an instance 102-1. The new object has both object content (the object 226 itself) as well as metadata 228, including an object ID 330 (e.g., a globally unique identifier). In this example, the object ID is 37129. When the size of the object 226 exceeds the chunk size (e.g., 2 MB, 4 MB, or 8 MB), the object 226 is split (504) into multiple chunks. Here there are three chunks C1, C2, and C3 (526). For each chunk, a content hash is computed (506). The content hashes for chunks C1, C2, and C3 are H1, H2, and H3 (528) respectively.

Different implementations use various methods to compute a content hash. Some primary requirements for constructing a content hash are that the output is small in size (e.g., a fixed size of 256 bytes), and produces unique or nearly unique outputs for distinct content chunks. One of skill in the art recognizes that there are many well-known hash algorithms that can be used. In addition, some implementations construct a content digest, which may be all or partially formed by sampling portions of a chunk. In implementations where the content hash is not guaranteed to by unique, the content index is more complex in order to differentiate between two distinct content chunks that have the same content hash.

Once a content hash is computed, such as content hash H3 (528), the object upload module 254 looks up (508) the content hash in the content index 250. In the scenario of FIG. 5, the hash values H1, H2, and H3 (528) are not found, and thus new records are inserted (510) into the content index 250. As illustrated, the key 520 for the content index entries is the content hash, and the content index 250 specifies the locations where the specified content chunk 238 is stored. A location specification within the chunk index 250 may specify an instance 102, a specific data store 224 at an instance, a file name or other identifier within a data store, an offset from the beginning of an allocation block, and so on. In FIG. 5, content chunk C2 with hash value H2 is stored at location L1 (524-A).

Regardless of whether a chunk was added to the content index, the object upload module 254 computes (512) a reference prefix that is used for inserting a chunk reference into the reference table 252. A reference prefix can be computed in several ways depending on the implementation. In some implementations, the reference prefix is computed as object ID (mod N), where N is the number of shards 280 for the reference table. In FIG. 5, there are 100 shards (N=100) (i.e., the reference prefix is the last two decimal digits). Although using base 10 and decimal digits facilitates the description in FIG. 5, typical implementations would use low order bits (e.g., the low order 8 bits, creating $2^8$=256 shards). In FIG. 5, with N=100 and the object ID=37129, the reference prefix is 29. One of skill in the art recognizes that there are alternative ways to compute a reference prefix, with the general objective to use a simple calculation that distributes the reference prefixes widely for distinct objects. In FIG. 5, the reference prefix is computed entirely based on the object ID, so all of the chunks for a single object will have object references stored in the same shard. In other implementations, the reference prefix calculation also uses the chunk identifier, chunk offset, or sequential chunk number (e.g., object ID+chunk offset (mod N)). Having identified the shard, the object references are inserted (514) into that shard (e.g., shard 29 (280-29)).

Although FIGS. 5 and 6 depict an implementation where the reference table 252 comprises a set of distinct shards, other implementations operate without the use of shards. Instead, the reference table is a single unit whose primary key begins with the reference prefix. Because the primary key begins with the reference prefix, the key values fan out and help to prevent hot spots, even when shards are not used. Note that hot spots are generally not an issue for the content index because as portions of the content index are accessed, they are placed in cache, where lookups are very fast. When many duplicates of the same object are uploaded around the same time, only one entry is inserted in the content index (one entry per chunk). All of the subsequent uploads quickly find the entry in cache and no additional entries are created. Therefore, the cached portion of the content index does not need to be refreshed.

FIG. 6 is similar to FIG. 5, but illustrating a scenario in which a new object 226 comprises object chunks 238 that are already stored and included in the chunk index 250. The new object 226 in FIG. 6 has content identical to the object uploaded in FIG. 5, but has a different object ID 330 (ID=80052). The object upload module 254 receives (502) the new object, splits (504) the new object into chunks, computes (506) the content hash for each of the content chunks, and looks up each of the content hashes in the content index 250. In this scenario, the content hashes are found in the content index 250, so no new entries are inserted (510). As in FIG. 5, the reference prefix is computed (512). Using N=100, the reference prefix is 52, and thus the new chunk reference records are inserted into shard 52 (280-52).

FIG. 6 illustrates a few points about the process. First, records are always inserted into the reference table 252, regardless of whether records are inserted into the content index 250. Second, two reference records corresponding to the identical content chunk 238 (e.g., chunk C1 from object 37129 and chunk C1 from object 80052) can be stored in distinct shards of the reference table 252.

Although FIG. 5 and FIG. 6 depict sequential uploads of objects with the same content, there has been no indication of how much time elapsed between the two uploads. The difference could be days or could be milliseconds. The latter timing indicates one of the advantages of the described process. Indeed, there could be a hundred or a thousand uploads of the same object content in less than a second (e.g., an email distribution list sends out a large attachment to many people simultaneously). By spreading out the chunk references in the reference table 252, hot spots are reduced or eliminated.

FIG. 6 also indicates that object chunk C2 with hash H2 has not moved. The locations 524-B are still the one location L1.

Figure 7:
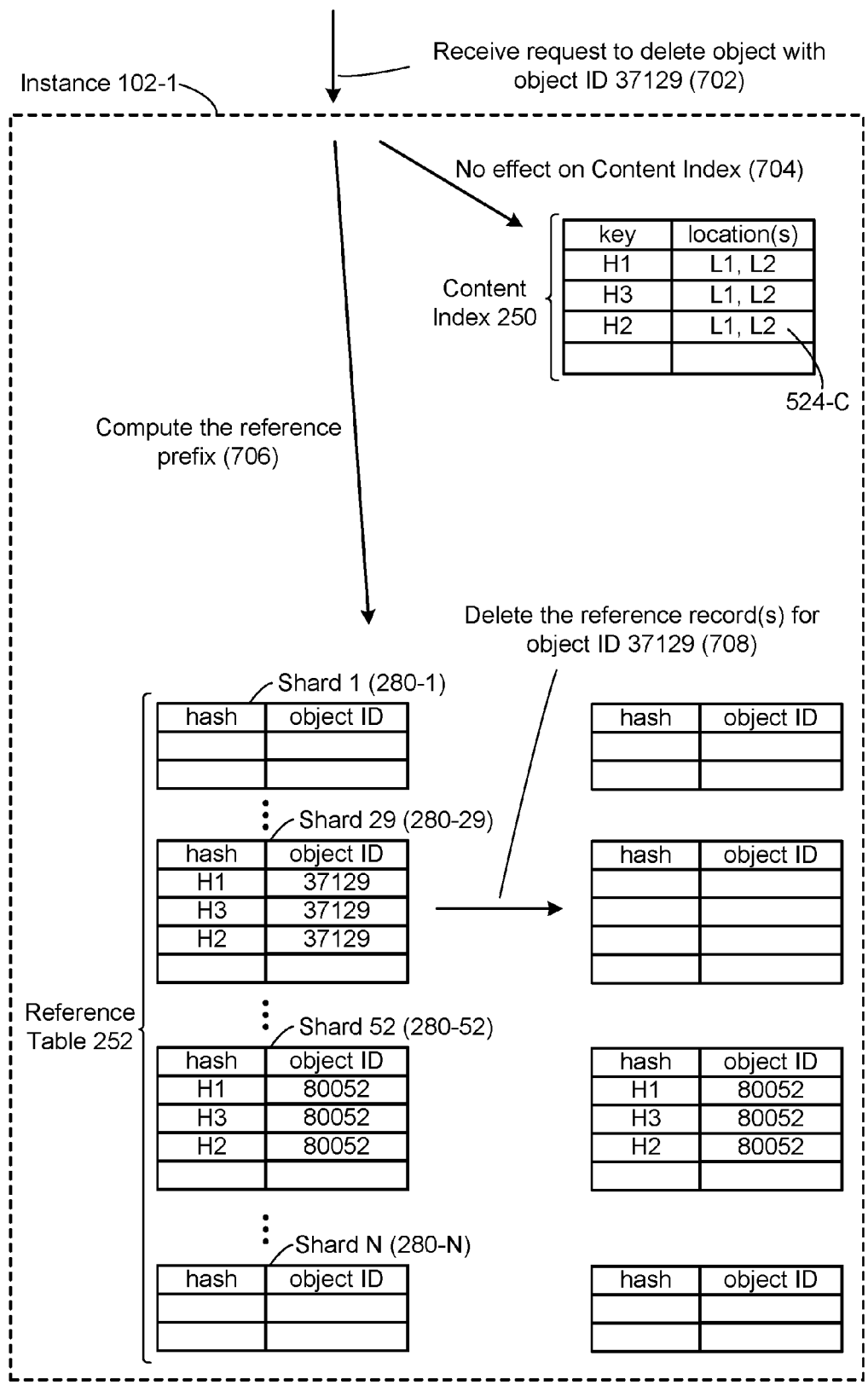
FIG. 7 illustrates a logical delete of an object from a database storage system in accordance with some implementations.

FIG. 7 illustrates the operation of the object removal module 256, which removes a reference from a database storage system in accordance with some implementations. An instance 102-1 receives (702) a request to delete an object with a specified object ID. In this example, the object ID is 37129. As illustrated in FIG. 7, the request to delete this object has no effect (704) on the content index 250 (or the corresponding storage). Note that prior to the deletion request, the locations of the object chunks have been modified. For example, object chunk C2 with content hash H2 is not at locations L1 and L2 (524-C). The physical storage of this chunk at locations L1 and L2 does not change based on the received request.

A reference prefix is computed (706) using the same algorithm applied when storing chunk references (as in FIGS. 5 and 6). Using the reference prefix, the object removal module 256 identifies the appropriate shard (here shard 29 (280-29)), and removes (708) the records from the shard corresponding to the specified object ID. In some implementations, the reference table 252 has an additional index on object ID, and thus finding the reference record(s) is quick. In some implementations, the object metadata 228 includes the content hashes for each of the chunks, and thus lookup of the reference records to delete can use the primary index.

Figure 8:
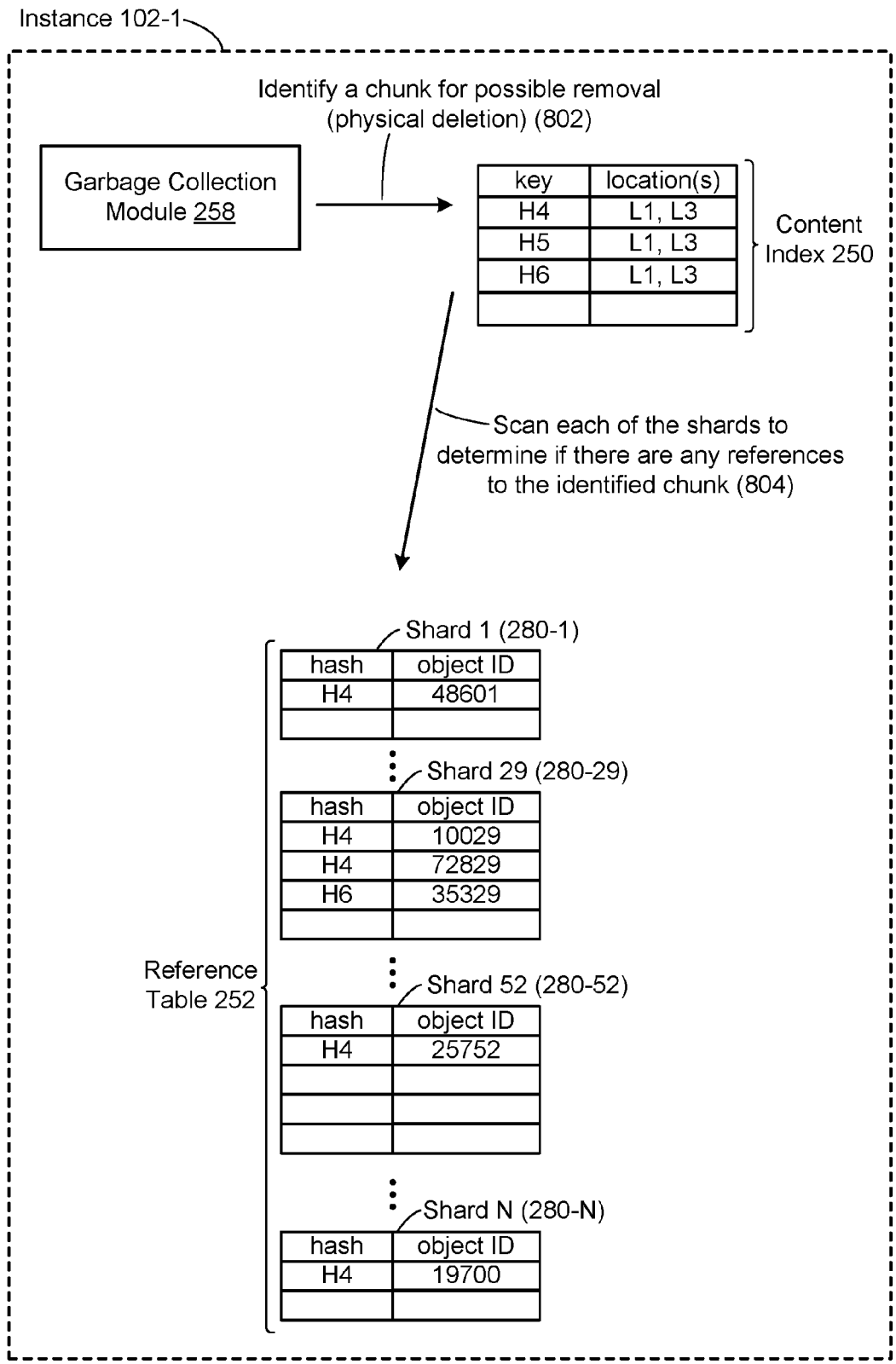
FIG. 8 illustrates a process of garbage collection in a database storage system in accordance with some implementations.

FIG. 8 illustrates operation of a garbage collection module 258 in a database storage system in accordance with some implementations. The garbage collection module 258 typically runs periodically to identify and remove content chunks that are no longer referenced. In some implementations, the garbage collection module runs daily or weekly, and typically at off-peak usage times.

The first step is to identify (802) a chunk for possible removal. One of skill in the art will recognize that there are various ways to identify deletion candidates. For example, based on object age, usage, or recent deletion of chunk references by the object removal module 256. In this example, assume that the identified chunk corresponds to content hash H4, H5, or H6. The garbage collection module 258 scans (804) each of the shards to determine if there are any references to the identified chunk. In FIG. 8, all references to content hashes H4, H5, or H6 are shown.

Although there are 100 shards, the scan terminates quickly for content hash H4 because we find a reference in shard 1 (280-1). Because there is at least one reference to this chunk, there is no need to scan further. For content hash H5, there are no references in any of the shards. A quick indexed search in each of the shards reveals that there are no references to content hash H5. Finally, the scan for content hash H6 will stop after searching shard 29 (280-29) because content hash H6 appears in that shard.

For content hash H5, the garbage collection module deletes or deallocates the space currently used for storage of the corresponding chunk, and the record for content hash H5 is deleted from the content index. In some implementations, safeguards are implemented to protect against improper garbage collection. For example, some implementations include a removal flag in the content index. The first time a chunk is set for physical deletion (such as for content hash H5 in FIG. 8), the removal flag is set, but not actually removed. The next time the garbage collection module runs, the shard scanning occurs again. As long as the content hash is still absent from the reference table, the corresponding chunk is removed from storage and the record deleted from the chunk index. On the other hand, if a chunk reference is found on the second scan, the removal flag is turned off for that chunk.

Figure 9A:
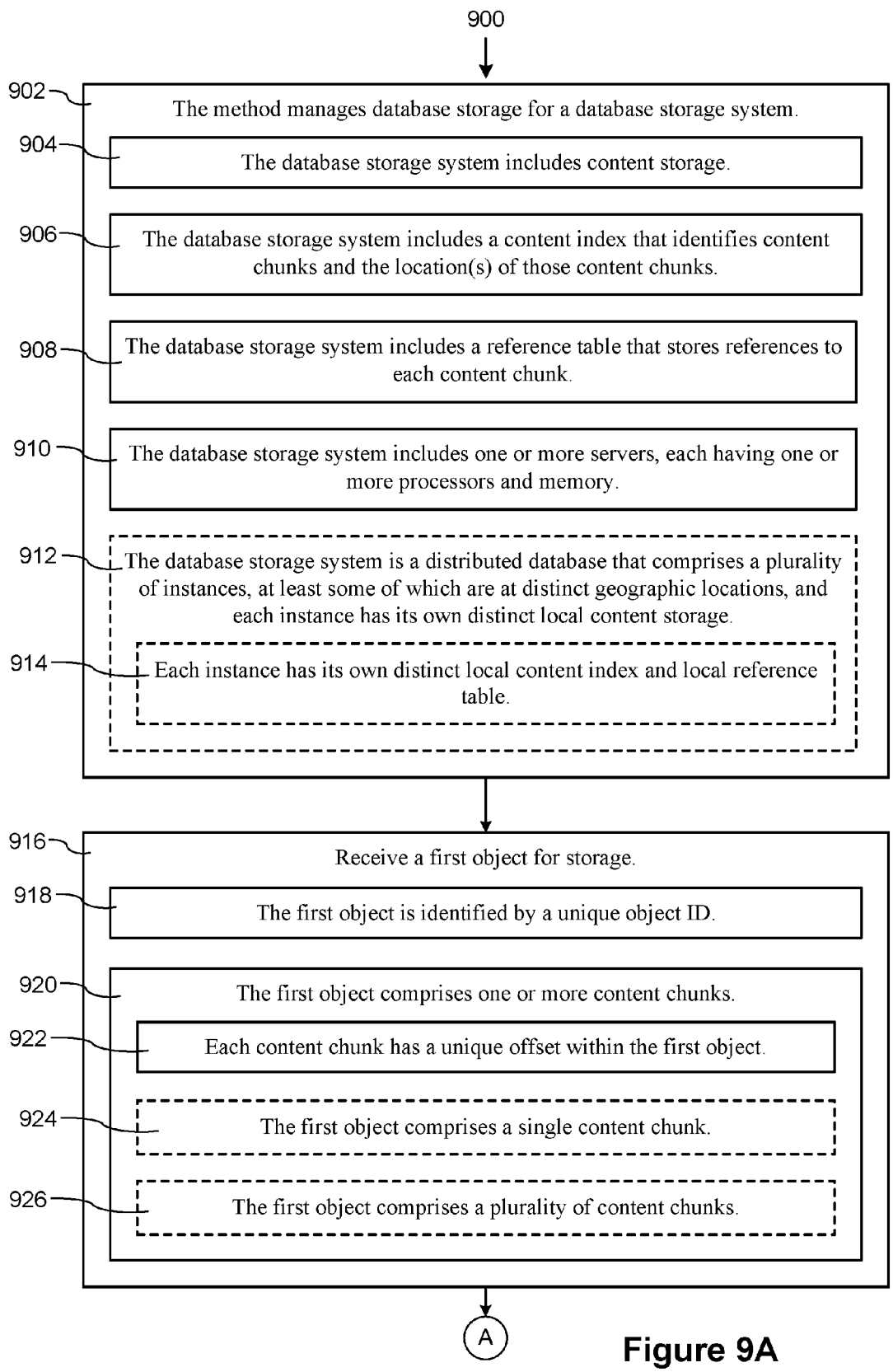
FIGS. 9A-9C illustrate a method of managing a database storage system according to some implementations.
Figure 9B:
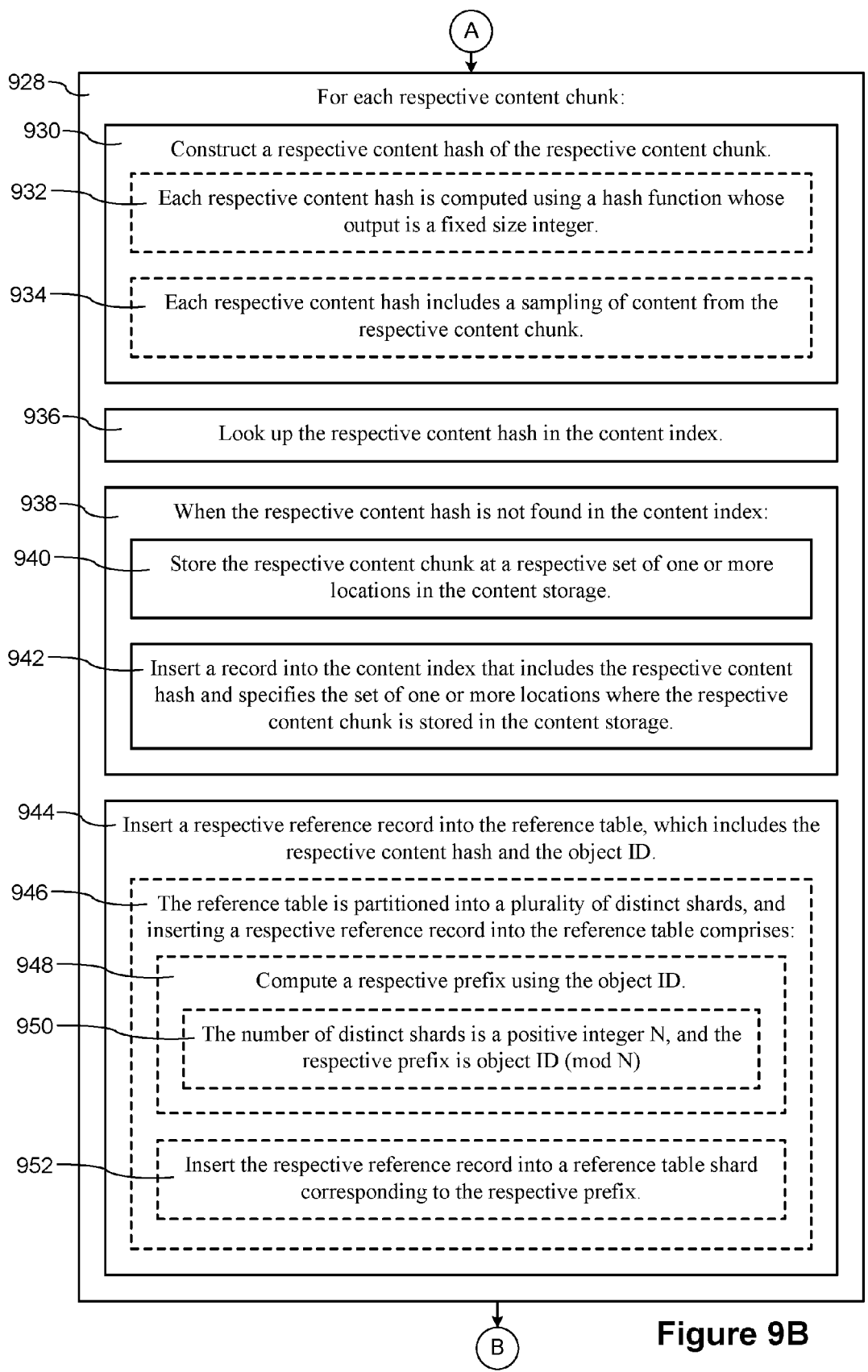
Figure 9C:
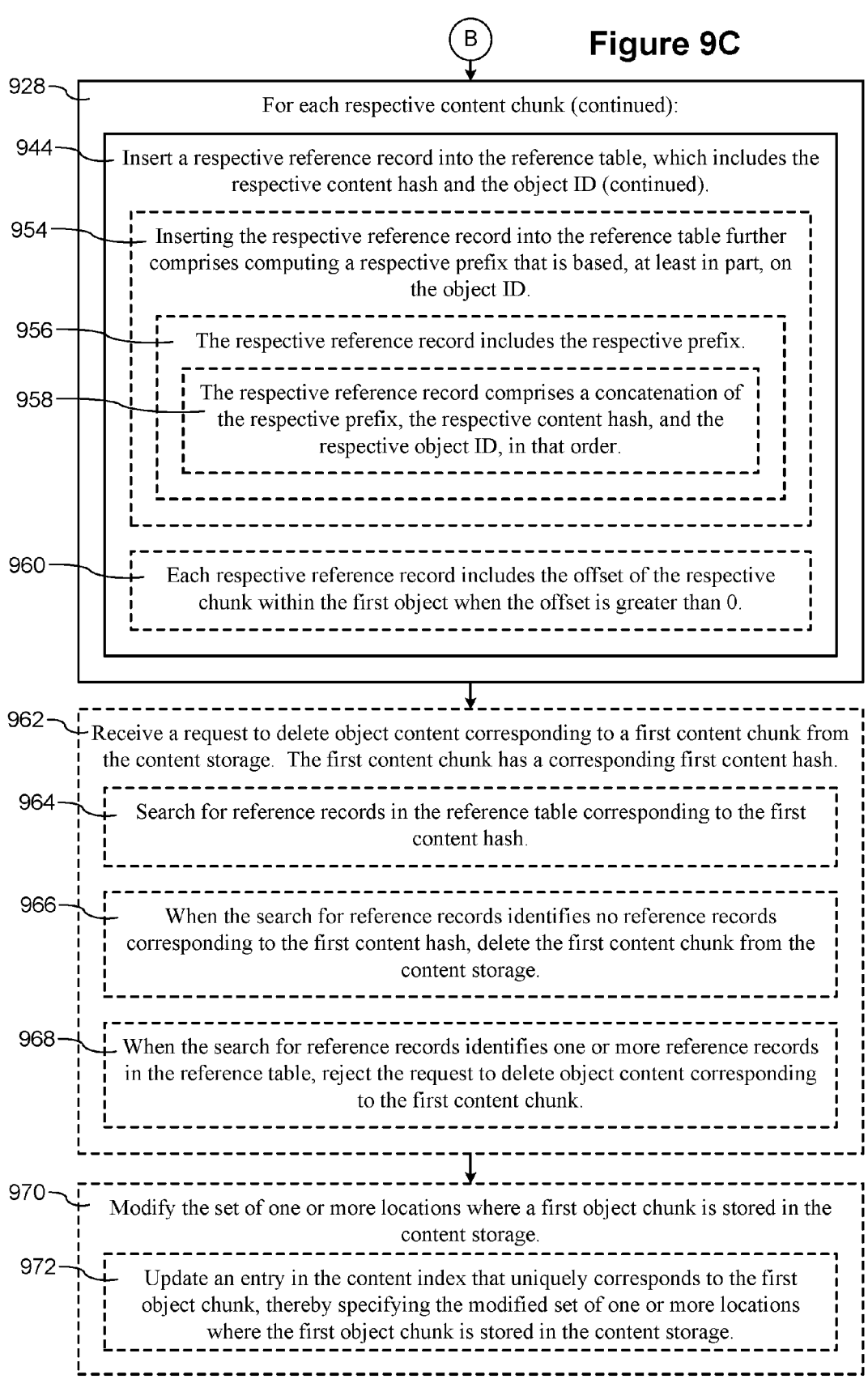

FIGS. 9A-9C illustrate a method 900 of managing (902) database storage for a database storage system 200. The database storage system 200 includes (910) one or more servers, such as servers 300 or instances servers 400. Each server has (910) one or more processors and memory. As illustrated in FIGS. 2 and 4, the database storage system 200 includes (904) data stores 224 for content storage. The database storage system also includes (906) a content index 250 that identifies content chunks and the locations of those content chunks. Typically the key for the content index 250 is a content hash. By looking up the content hash of a new chunk, the database storage system prevents saving multiple copies of the same content. The storage location(s) specified in the content index indicate where chunk content is physically stored (e.g., at what instances 102, in what data stores 224, what location within a data store, and so on).

The database storage system 200 also includes (908) a reference table 252 that stores references to each content chunk 238. Whereas the content index 250 has a single entry for a given content chunk 238, the reference table 252 has an entry for each reference to the content chunk 238. For example, if a million identical copies of an object 226 are uploaded to the database storage system 200, the content chunks 238 for that object 226 are stored only once (but generally at multiple locations), and the content index 250 identifies the locations where each content chunk 238 are physically stored. On the other hand, the reference table 252 would have a million entries, indicating the many distinct objects that have the same content. As long as a content chunk 238 has at least one reference, it is still active, and should not be removed.

In some implementations, the database storage system 200 is (912) a distributed storage system, as described in more detail with respect to FIGS. 1 and 2. The distributed storage system comprises a plurality of instances 102, at least some of which are at distinct geographic locations. Each instance has (912) its own distinct local content storage. In some implementations of a distributed storage system, each instance has (914) its own distinct local content index and local reference table.

The database storage system 200 receives (916) a first object at an instance 102, as illustrated in FIGS. 5 and 6. The first object 226 is identified (918) by a unique object ID 330. Distinct objects 226 with their own unique object IDs 330 can still have identical content. For example, an email with an attached digital photograph is sent to three people. The same photograph is received by each of the three people, but each has a distinct copy with its own object ID 330. Each object 226 comprises (920) one or more content chunks 238. Each content chunk 238 has a unique offset within the first object 226 (e.g., the number of bytes from the beginning of the object). Typically an implementation specifies a maximum chunk size (either as a constant or as a configurable parameter), which is commonly 2 MB, 4 MB, 8 MB, or 16 MB. If an object's content size does not exceed the maximum chunk size, there is a single chunk. Otherwise, the object is split into multiple chunks. For example, if an uploaded object is 11 megabytes, and the maximum chunk size is 4 megabytes, there will be 3 chunks (the ceiling of 11/4). Typically, implementations create chunks that are the maximum chunk size (except for the last one), so in the above example, the three chunks would have size 4 MB, 4 MB, and 3 MB. Because the number of chunks for an object 226 depends on the maximum chunk size and the size of the object, some objects comprise (924) a single content chunk, whereas other objects comprise (926) a plurality of content chunks. Most objects comprise a single chunk.

Once the chunks for an object have been created, the object upload module 254 performs a sequence of operations for each of the chunks 238. For each (928) respective content chunk, the object upload module 254 constructs (930) a content hash of the content chunk 238. Some implementations compute (932) a content hash using a secure hash algorithm such as 512 bit SHA-2 or SHA-3. Other implementations use alternative hash functions, construct (934) a content digest using sampling from the content, or combine a hash function with content sampling. As used herein, the term "content hash" is not limited to the output of a hash function.

After the content hash is constructed for a chunk, the object upload module 254 looks up (936) the content hash in the content index 250. When the content hash is not found (938) in the content index, the object upload module 254 stores (940) the content chunk at a set of one or more locations in the content storage. In addition, the object upload module inserts (942) a record into the content index 250 that includes the content hash and specifies the set of locations where the content chunk is stored in the content storage. This scenario was described above with respect to FIG. 5. Regardless of where a record is inserted into the content index 250, the object upload module 254 continues its processing with the reference table 252.

The object upload module 254 inserts (944) a record into the reference table 252. The reference record includes (944) the content hash as well as the object ID 330. Because of the potential for large numbers of duplicate objects, the reference table could develop hot spots that degrade performance. To address this issue, implementations use a reference prefix that "fans out" the references to the same object.

In some implementations, the reference records are fanned out by partitioning (946) the reference table 252 into a plurality of distinct shards (e.g., 256 shards), which separately stored pieces of the reference table (e.g., stored as separate files on a file system). In these implementations, the object upload module 254 computes (948) a reference prefix for the chunk using the object ID. The number of possible prefix values corresponds to the number of shards. For example, the reference prefix can be computed as the low order 8 bits of the object ID 330. This is equivalent to computing object ID (mod $2^8$). More generally, a reference prefix can be computed (950) as object ID (mod N), where N is a positive integer (which equals the number of shards). This calculation of the reference prefix assumes that the low order bits of each object ID are well distributed (for example, if the low order 8 bits of the object ID's was a fixed constant or only identified the user application 246 that created the object 226, it would not help to fan out the records in the reference table). Depending on the structure of the object IDs 330 (if any), alternative algorithms may be used to compute the reference prefix. Some implementations use both the object ID 330 and the chunk offset to compute the reference prefix. For example, object ID+offset (mod N). In some implementations, the offset used in this calculation is specified in bytes; in other implementations, the offset is specified as the sequential number of the chunk (e.g., an offset of 0 for the first chunk, an offset of 1 for the second chunk, and so on). By including the chunk offset in the calculation, multiple chunks for a single object are not all assigned the same reference prefix.

Using a correspondence between shards and reference prefixes, each reference record is inserted (952) into the appropriate shard. This process is illustrated above in FIGS. 5 and 6.

Rather than using shards for the reference table, some implementations include (956) the reference prefix in the inserted reference record. Because the reference prefix is the first part of the primary key for the reference table 252, the reference prefix has the same effect of "fanning out" the primary key entries. The reference prefix for these implementations is computed (954) as described above, using the object ID 330 (and potentially the chunk offset). In some implementations, each reference record includes the reference prefix, the content hash, and the object ID. In some implementations, the chunk ID or chunk offset is also included in each reference record, or is combined with the object ID 330. In some implementations, this data in each reference record is concatenated (958), forming a single string (or byte sequence) that includes the reference prefix, the content hash, and the object ID. In some implementations, the concatenation also includes the chunk offset or chunk ID. In some implementations, each reference record includes the chunk offset when (960) the offset is greater than 0 (i.e., not the first chunk).

In addition to storing data in the database storage system, data is later removed or deleted as it is no longer needed. Each online application 246 can specify its own rules for when objects are automatically deleted (e.g., after a certain period of time or absence of use). In addition, users 240 of the applications 246 can choose to delete objects (e.g., old emails, or photos or videos that are no longer of interest). In the context of the database storage system, there are two distinct concepts of "deletion." From the perspective of a user 240, pressing a "delete" or similar button removes the object, and it is no longer available for access. However, that delete just activates the object removal module 256 to remove the user's reference record to the object content. This is described above in FIG. 7. Other users may still have their own object references. Even if a chunk has only one object reference, and the one user with a reference to that chunk deletes it, the content is not removed immediately. Physical deletion or deallocation of storage space for a chunk is performed as a batch process by the garbage collection module 258, as described above in FIG. 8. In sum, the object removal module performs "logical deletes," which occur as requested by a user 240 and/or user application 246. On the other hand, the garbage collection module 258 performs "physical deletes," which deallocate the space formerly used by object chunks. In some implementations, deallocation physically erases the content from the physical storage (e.g., setting all bits to 0).

In some instances, the database storage system 200 receives (962) a request from the garbage collection module 258 to delete object content corresponding to a first content chunk from the content storage. The first content chunk 238 has (962) a corresponding first content hash. The reference table is searched (964) for reference records corresponding to the first content hash. As illustrated in FIG. 8, in some implementations the search involves searching a plurality of shards. When the search for reference records identifies no reference records corresponding to the first content hash, the first content chunk is deleted (966) from the content storage, and the content index is updated to remove the record corresponding to the deleted chunk. When the search for reference records identifies one or more reference records in the reference table corresponding to the first content hash, the request to delete object content corresponding to the first content chunk is rejected (968) (or just ignored). In most implementations, as soon as one corresponding reference record is found, the search stops because additional references would not make any difference.

As illustrated in FIGS. 5 and 6, the content index 250 stores the location(s) 522 where each content chunk is stored in the content storage. In some circumstances, the set of locations 522 is modified (970). When this occurs for a first content chunk 238, the database storage system 200 updates (972) the entry in the content index 250 that corresponds to the first content chunk 238. The content index 250 thereby correctly specifies the modified set of locations 522 where the first object chunk 238 is stored in the content storage.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of managing database storage, comprising:
  at a database storage system having one or more processors and memory:
    receiving for storage a first object comprising one or more content chunks, wherein the first object is identified by a unique object ID and each content chunk of the one or more content chunks has a unique offset within the first object;

for each respective content chunk of the one or more content chunks, inserting a respective reference record into a reference table, wherein the respective reference record includes a respective content hash and the unique object ID;

storing each of the one or more content chunks in content storage within the database storage system;

obtaining a request to delete a first content chunk from the content storage, wherein the first content chunk has a corresponding first content hash;

determining whether the reference table includes at least one reference record corresponding to the first content hash;

in accordance with a determination that the reference table does not include at least one reference record corresponding to the first content hash, deleting the first content chunk from the content storage; and in accordance with a determination that the reference table includes at least one reference record corresponding to the first content hash, forgoing deleting object content corresponding to the first content chunk.

2. The method of claim 1, wherein the reference table is partitioned into a plurality of distinct shards, and wherein inserting a respective reference record into the reference table comprises:

computing a respective prefix that is based, at least in part, on the object ID; and inserting the respective reference record into a reference table shard corresponding to the respective prefix.

3. The method of claim 2, wherein the object ID is an integer, the number of distinct shards is a positive integer N, and the respective prefix is object ID (mod N).

4. The method of claim 1, wherein inserting the respective reference record into the reference table further comprises computing a respective prefix that is based, at least in part, on the object ID; and wherein the respective reference record includes the respective prefix.

5. The method of claim 4, wherein the respective reference record comprises a concatenation of the respective prefix, the respective content hash, and the respective object ID, in that order.

6. The method of claim 1, wherein each respective content hash is computed using a hash function whose output is a fixed size integer.

7. The method of claim 1, wherein each respective content hash includes a sampling of content from the respective content chunk.

8. The method of claim 1, wherein each respective reference record includes the offset of the respective content chunk within the first object when the offset is greater than 0.

9. The method of claim 1, wherein the database storage system is a distributed database that comprises a plurality of instances, at least some of which are at distinct geographic locations, and each instance has its own distinct local content storage.

10. The method of claim 9, wherein each instance has its own distinct local content index and local reference table.

11. The method of claim 1, further comprising:

modifying the set of one or more locations where a first content chunk is stored in the content storage; and updating an entry in the content index that uniquely corresponds to the first content chunk, thereby specifying the modified set of one or more locations where the first content chunk is stored in the content storage.

12. A computer system for managing database storage, comprising:

one or more processors;

memory;

content storage and a reference table both stored in the memory, wherein the reference table stores references to each content chunk; and one or more programs stored in the memory, the one or more programs comprising instructions executable by the one or more processors for:

receiving for storage a first object comprising one or more content chunks, wherein the first object is identified by a unique object ID and each content chunk of the one or more content chunks has a unique offset within the first object;

for each respective content chunk of the one or more content chunks, inserting a respective reference record into a reference table, wherein the respective reference record includes a respective content hash and the unique object ID;

storing each of the one or more content chunks in content storage within the database storage system;

obtaining a request to delete a first content chunk from the content storage, wherein the first content chunk has a corresponding first content hash;

determining whether the reference table includes at least one reference record corresponding to the first content hash;

in accordance with a determination that the reference table does not include at least one reference record corresponding to the first content hash, deleting the first content chunk from the content storage; and in accordance with a determination that the reference table includes at least one reference record corresponding to the first content hash, forgoing deleting object content corresponding to the first content chunk.

13. The computer system of claim 12, wherein the reference table is partitioned into a plurality of distinct shards, and wherein the instructions for inserting a respective reference record into the reference table further comprise instructions for:

computing a respective prefix that is based, at least in part, on the object ID; and inserting the respective reference record into a reference table shard corresponding to the respective prefix.

14. The computer system of claim 12, wherein the instructions for inserting the respective reference record into the reference table further comprise instructions for computing a respective prefix that is based, at least in part, on the object ID; and wherein the respective reference record includes the respective prefix.

15. The computer system of claim 14, wherein the respective reference record comprises a concatenation of the respective prefix, the respective content hash, and the respective object ID, in that order.

16. The computer system of claim 12, wherein each respective reference record includes the offset of the respective content chunk within the first object when the offset is greater than 0.

17. A non-transitory computer readable storage medium storing one or more programs configured for execution by one or more processors of a computer system to manage database storage in a database storage system, wherein the database storage system has content storage, a content index that identifies content chunks, and a reference table that stores references to each content chunk, and wherein the one or more programs comprise instructions for:

receiving for storage a first object comprising one or more content chunks, wherein the first object is identified by a unique object ID and each content chunk of the one or more content chunks has a unique offset within the first object;

for each respective content chunk of the one or more content chunks, inserting a respective reference record into a reference table, wherein the respective reference record includes a respective content hash and the unique object ID;

storing each of the one or more content chunks in content storage within the database storage system;

obtaining a request to delete a first content chunk from the content storage, wherein the first content chunk has a corresponding first content hash;

determining whether the reference table includes at least one reference record corresponding to the first content hash;

in accordance with a determination that the reference table does not include at least one reference record corresponding to the first content hash, deleting the first content chunk from the content storage; and in accordance with a determination that the reference table includes at least one reference record corresponding to the first content hash, forgoing deleting object content corresponding to the first content chunk.

18. The computer readable storage medium of claim 17, wherein the reference table is partitioned into a plurality of distinct shards, and wherein the instructions for inserting a respective reference record into the reference table further comprise instructions for:

computing a respective prefix that is based, at least in part, on the object ID; and inserting the respective reference record into a reference table shard corresponding to the respective prefix.

19. The computer readable storage medium of claim 17, wherein the instructions for inserting the respective reference record into the reference table further comprise instructions for computing a respective prefix that is based, at least in part, on the object ID; and wherein the respective reference record includes the respective prefix.

20. The computer readable storage medium of claim 19, wherein the respective reference record comprises a concatenation of the respective prefix, the respective content hash, and the respective object ID, in that order.

* * * * *